(12) United States Patent
Masuzawa et al.

(10) Patent No.: US 6,384,502 B1
(45) Date of Patent: May 7, 2002

(54) DISKETTE INCORPORATING PERMANENT MAGNET GENERATOR

(75) Inventors: Masahiro Masuzawa, Fukaya; Fumio Kimura, Gyoda; Toshiko Takahashi; Masahiro Mita, both of Fukaya; Kenichi Kitta, Tokyo; Takehiro Takahashi, Ibaragi, all of (JP)

(73) Assignees: Hitachi Metals, Ltd., Tokyo; Hitachi Maxell, Ltd., Osaka, both of (JP)

( * ) Notice: Subject to any disclaimer, the term of this patent is extended or adjusted under 35 U.S.C. 154(b) by 0 days.

(21) Appl. No.: 09/613,824

(22) Filed: Jul. 11, 2000

(30) Foreign Application Priority Data

Jul. 16, 1999 (JP) .............................. 11-202415
Mar. 15, 2000 (JP) ........................ 2000-071573

(51) Int. Cl.[7] .......................... H02K 21/00; H02K 1/00; H02K 1/12; G11B 5/76
(52) U.S. Cl. .................... 310/152; 360/137; 310/75 R; 310/156.01
(58) Field of Search ................................ 310/152, 156, 310/40 MM, DIG. 6, 75 R; 235/492, 493, 449; 360/132, 133, 137

(56) References Cited

U.S. PATENT DOCUMENTS

| 4,001,887 | A | * | 1/1977 | Platt et al. ..................... 360/90 |
| 5,159,182 | A | | 10/1992 | Eisele ......................... 235/492 |
| 5,982,577 | A | * | 11/1999 | Brown et al. ............... 360/96.3 |
| 6,089,459 | A | * | 7/2000 | Eisele et al. ................. 235/492 |

FOREIGN PATENT DOCUMENTS

JP  7-500238  1/1995  .......... H02K/21/14

* cited by examiner

Primary Examiner—Burton S. Mullins
(74) Attorney, Agent, or Firm—Sughrue Mion, PLLC

(57) ABSTRACT

A permanent magnet generator incorporated in a diskette that can be inserted into a floppy disk drive is disclosed. In the permanent magnet generator, electric power is generated as a rotor is caused to rotate at a revolution twice to ten times as high as that of the drive shaft of a floppy disk drive by transmitting the rotation of the drive shaft to a rotor via a speed increasing mechanism incorporated in a diskette. Since the cogging torque of the generator is reduced, the rotor can be caused to rotate with a small drive torque. This allows the generator to produce a high output.

23 Claims, 13 Drawing Sheets

DISKETTE INCORPORATING PERMANENT MAGNET GENERATOR

BACKGROUND OF THE INVENTION

1. Field of the Invention

The present invention relates generally to a permanent magnet generator, and more particularly to a permanent magnet generator that can be incorporated in a diskette designed to be used by inserting into a floppy disk drive, and when a memory, such as a magnetic card, is installed in the diskette, serves as a power source for the memory to write and read data in the memory.

2. Description of the Related Art

Medical information, such as personal medical checkup results, is stored in an IC card, from which medical institutions can retrieve such information for use in the treatment of a patient, and can store in the card the contents of his case records after some medical treatments. Plans are also now under way to use IC cards as electronic money. Under the plans, data on a customer's bank account, password, and the balance of his account, if necessary, are stored in an IC card, by means of which payment is made on-line every time the card holder spends money.

It has been proposed that an enormous amount of video information handled by a digital camera be stored in a flash memory that has a capacity as large as several megabytes to 10 megabytes. A flash memory containing the video information taken by a digital camera can be connected to a personal computer for subsequent video processing. The use of a flash memory to record the video information taken by a digital camera may eliminate an additional external memory unit, such as MOs.

The widespread use of IC cards or flash memories, however, has been deterred by the need for special input/output (I/O) devices dedicated for such media. Since most commonly used I/O devices for personal computers are floppy disk drives, particularly 3.5" floppy disk drives, the use of 3.5" floppy disks as an I/O device for IC cards and flash memories could spur their proliferation. In fact, methods for writing and reading data into and from an IC card or flash memory are being studied, and adapters that can be inserted or incorporated in 3.5" floppy disk drives have already been proposed. A conventional type of 3.5" floppy disk drive has a magnetic head to read and write information from and into a 3.5" diskette, and a drive shaft to cause the diskette to rotate at 300 rpm, but it has no power feeding terminals. In diskette-shaped adapters, a button battery is incorporated to power the built-in CPU. A battery, which depletes as it is used, has to be replaced with a new one every four to five months at the longest.

Introduction of a 3.5" floppy disk in which a generator is incorporated and driven by the rotation of the drive shaft of a 3.5" floppy disk drive would prove very useful, giving momentum to the proliferation of IC cards and similar media. In fact, the concept of incorporating a generator in a 3.5" diskette has already been proposed in U.S. Pat. No. 5,159,182 SMART DATA STORAGE DEVICE, issued Oct. 27, 1992 to Raymund H. Eisele and Tokuhyo Hei-7(1995)-500238, a published Japanese translation of PCT international publication for patent application.

U.S. Pat. No. 5,159,182 discloses that a generator is incorporated in a 3.5" diskette, and that the generator has a rotor, a stator and a regulator, but its detailed construction is not disclosed. Tokuhyo Hei-7(1995)-500238 discloses a generator incorporated in a 3.5" diskette having a permanent magnet that rotates with a hub, which is caused to rotate by the drive shaft of a floppy disc drive. This permanent magnet is of a cylindrical shape, magnetized in the axial direction so that multiple magnetic poles are provided on the both end faces of the cylinder. The magnetic poles of a stator yoke are disposed in such a manner as to sandwich the cylindrical permanent magnet, and a stator coil is provided between the stator yokes on both sides of the cylindrical permanent magnet. Another example is also disclosed in which magnetic poles are provided on the circumferential surface of the cylindrical permanent magnet. In this example, the magnetic poles of the stator yoke are of a claw pole shape.

Now, let us consider a permanent magnet generator of a size that can be incorporated in a 3.5" floppy disk, as disclosed in Tokuhyo Hei-7(1995)500238, where the cylindrical permanent magnet is magnetized in the direction of the rotating shaft of the rotating permanent magnet in such a manner that multiple magnetic poles are provided on the both end faces of the cylinder. In this case, stator magnetic poles are disposed on both sides of the cylinder end face with small magnetic gaps. Since the allowable thickness of a generator in a diskette is 2.0 to 2.5 mm, the permanent magnet is allowed to have a thickness of only 0.5 to 0.8 mm at most. Even when a material having a large coercive force is used for a magnet with such a short distance between magnetic poles, only a small magnetomotive force could be expected. Even if magnetomotive force is increased by increasing the thickness of the magnet, the allowable thickness of the stator magnetic poles is reduced, making it difficult to pass a sufficient amount of magnetic flux in them.

In a permanent magnet generator where magnetic poles are provided on the circumferential surface of the cylindrical permanent magnet and the claw pole type stator yoke is provided, as disclosed in Tokuhyo Hei-7(1995)-500238, the end yokes of both claw pole type magnetic poles are provided facing each other within the thickness of 2.0 to 2.5 mm allowed for the generator, and a stator winding is provided between the end yokes. Since a sufficient number of winding turns cannot be provided within the thickness of no more than 1 mm allowed for the stator winding, a generator having a low output voltage would inevitably result.

In order to realize a generator having as high an output as possible and the lowest possible distortion, it is necessary to dispose rotor magnetic poles on the circumferential surface of the cylindrical permanent magnet at equal angular intervals, and make the number of magnetic poles of the stator yokes equal to the number of magnetic poles of the rotor permanent magnet, so that the stator magnetic poles can face the permanent magnet magnetic poles.

In order to implement a diskette which serves as an information I/O device in conjunction with a memory card having magnetic stripes, such as an IC card, a space for housing a memory card must be provided in the diskette. The typical size of a standard memory card is 85 mm in length, 54 mm in width, and 0.8 mm in thickness. Since the thickness given above ignores the embossed part for raised letters of the memory card, its actual thickness is a little bit thicker. To provide a space for a memory card and a permanent magnet type generator in a 3.5" diskette having a thickness of 3.5 mm and two 0.2 mm-thick covers on both sides, the thickness of the generator must be not more than 2.0 mm, allowing for the thickness of the memory card of 0.8 mm and some clearance for loading and unloading the card.

One of the present assignees has already filed a U.S. patent application for a diskette having a permanent magnet type generator, Ser. No. 09/369,420, filed Aug. 6, 1999. The diskette according to the patent application is shown in FIG. 19. A diskette 9 shown in the figure incorporates a permanent magnet generator 90 around a hub 911 disposed at the center thereof in such a manner that a ring-shaped permanent magnet 912 having magnetic poles on the outer circumferential surface thereof can be rotated together with the hub. A generator stator 92 is provided inside the diskette on the outer periphery of a permanent magnet 912 of a rotor 91, with a magnetic gap between the magnetic poles on the outer circumferential surface of the permanent magnet 912. The diskette 9, which is designed to be used as an I/O device for IC card or memory card, has a space 95 for accommodating a memory card, and a card contact terminal 96 used for exchanging information with the memory card. An I/O terminal 97 for exchanging information between the diskette and a magnetic head of a floppy disk drive is provided at an opening 93 provided for allowing the magnetic head to access the diskette. A CPU 98 is provided as necessary to process information between the I/O terminal 97 and the card contact terminal 96. The permanent magnet generator 90 is used as a power source for driving the CPU 98 and the card contact terminal 96. As a drive power, the output of the generator is usually fed via a stabilized power supply circuit 99.

The permanent magnet generator disclosed in U.S. patent application Ser. No. 09/369,420 has a permanent magnet rotor with magnetic poles on the outer circumferential surface of a ring-shaped permanent magnet, stator magnetic poles arranged on the circumferential inside surface at such positions that the stator magnetic poles can face the rotor magnetic poles, and stator magnetic pole teeth extending outward from each of the stator magnetic poles. To increase the output of the permanent magnet generator, a permanent magnet having the highest possible coercive force and residual magnetic flux density, or more desirably a sintered anisotropic NdFeB magnet, is used. Coils wound on stator magnetic pole teeth should have as many as 6000 turns in total.

The rotation of the rotor, however, relies solely on the rotating force of the floppy disk drive, which is typically as small as 300 rpm. This limits the output of the generator to 20 mW or so at most.

The use of a sintered NdFeB magnet having good magnetic characteristics to improve the output, on the other hand, would tend to increase cogging torque because the magnetic flux density around the magnet rotor using this magnet almost invariably becomes a square wave, resulting in a steep magnetic flux density distribution between the magnetic poles. To ensure the smooth rotation of the rotor of a permanent magnet generator in a floppy disk drive, it is necessary to limit the cogging torque of the rotor to not more than 2.5 mNm at most. To this end, various attempts, including providing enclosed slots between the stator magnetic poles, have been made to reduce cogging torque. The enclosed slot type stator, however, has often further reduced the output because part of the magnetic flux from the magnet rotor is short-circuited between the stator magnetic poles.

As described earlier, attempts have been made to increase the number of turns of the stator coil to cope with the output, but fine windings have had to be used to provide a large amount of windings in a limited space of the diskette, resulting in an increase in the internal resistance of the generator. Furthermore, the length of the magnetic pole teeth has had to be increase to allow a large amount of windings to be wound on the stator magnetic pole teeth. This has not only increased magnetic resistance but also required a larger space within a limited space in the diskette.

All this has led to an increase in the cost of a permanent magnet generator incorporated in a diskette.

SUMMARY OF THE INVENTION

It is therefore an object of the present invention to provide a diskette incorporating a permanent magnet generator that can reduce or eliminate the aforementioned shortcomings and ensure a high generating output.

It is another object of the present invention to provide a diskette incorporating a permanent magnet generator whose generating output is increased by reducing cogging torque.

It is a further object of the present invention to provide a diskette in which the thickness of a generator or a magnet used therein can be increased by preventing a space for a memory card from overlapping with a permanent magnet generator.

It is a still further object of the present invention to provide a diskette incorporating a permanent magnet generator that can be manufactured at low cost.

To achieve these objectives, the diskette incorporating a permanent magnet according to the present invention comprises a diskette case having a magnetic disk shape, and a hub provided therein and driven by an external driving mechanism, and a permanent magnet generator provided inside the diskette case and having a rotor that is caused to rotate by the hub;

the permanent magnet generator comprising a rotor having a rotatable (preferably, ring-shaped) permanent magnet having a plurality of magnetic poles arranged on the circumference thereof which magnetic poles have alternately different polarities in the circumferential direction, and a stator having a plurality of stator magnetic pole teeth, the plurality of stator magnetic pole teeth each having a stator magnetic pole at an end thereof disposed at such a position as to be able to face one of the rotor magnetic poles via a magnetic gap, extending outward from the stator magnetic pole and having a stator coil wound thereon;

the rotor and the stator formed into a flat disc shape as a whole, in which a rotation transmitting mechanism for connecting the rotor of the permanent magnet generator to the hub is provided inside the diskette case; the rotation transmitting mechanism being a speed increasing mechanism.

In the diskette incorporating a permanent magnet generator according to the present invention, the rotation transmitting mechanism should preferably be a speed increasing mechanism capable of increasing speed twofold to tenfold. The rotating axis of the hub can be arranged coaxially or offset with the rotating axis of the rotor. The rotation transmitting mechanism may be of an endless belt type, or a gear type, or a rubber roller type. When the rotating axis of the hub is arranged coaxially with the rotating axis of the rotor, with the rotation transmitting mechanism being of a coaxial type, the coaxial rotation transmitting mechanism should preferably be of a planetary type.

The diskette incorporating a permanent magnet generator according to the present invention may comprise:

a diskette case having magnetic disk shape, and a hub provided therein and driven by an external driving mechanism, and a permanent magnet generator provided inside the diskette case and having a rotor that is caused to rotate by the hub;

the permanent magnet generator comprising
- a rotor having a rotatable (preferably, ring-shaped) permanent magnet having a plurality of magnetic poles arranged on the circumference thereof which magnetic poles have alternately different polarities in the circumferential direction, and
- a stator having a plurality of stator magnetic pole teeth, the plurality of stator magnetic pole teeth each having a stator magnetic pole at an end thereof disposed at such a position as to be able to face one of the rotor magnetic poles via a magnetic gap, extending outward from the stator magnetic pole and having a stator coil wound thereon;

the rotor and the stator constructed into a flat disc as a whole, in which a rotation transmitting mechanism for connecting the rotor of the permanent magnet generator to the hub is provided inside the diskette case, and the rotating axis of the hub is arranged offset with the rotating axis of the rotor. In such a case, a space for accommodating a memory card is provided in the diskette case; the space should preferably be not overlapped with the permanent magnet generator while lying within a plane inside the diskette case.

In the diskette incorporating a permanent magnet generator according to the present invention, the gap magnetic flux density distribution of the permanent magnet generator should preferably be a sinusoidal curve. In such a case, the (ring-shaped) permanent magnet should preferably be a bonded magnet.

In the diskette incorporating a permanent magnet according to the present invention, it is desirable that certain stator magnetic poles among the stator magnetic poles of the generator be disposed at such locations as to be able to face the rotor magnetic poles, and that the remaining stator magnetic poles be disposed at locations about 90 degrees, in terms of electrical angle, shifted from the aforementioned certain number of stator magnetic poles to reduce cogging torque. It is also desirable that the number of certain stator magnetic poles disposed at such locations as to be able to face the rotor magnetic poles be about half of the total number of the stator magnetic poles. It is also desirable that certain stator magnetic pole teeth extending outward of the rotor from each of the certain number of stator magnetic poles and having stator coils wound thereon be connected to each other by a back yoke made of soft magnetic material at the outer side edges, and the stator magnetic pole teeth extending outward of the rotor from each of the remaining stator magnetic poles and having stator coils wound thereon be connected to each other by another back yoke made of soft magnetic material at the outer side edges.

The stator used in the present invention should preferably have a plurality of auxiliary magnetic poles at such locations as to be able to face the rotor magnetic poles via magnetic gaps; each of the auxiliary magnetic poles preferably not having stator coils and being connected to each other by back yokes made of soft magnetic material to further reduce cogging torque. It is also desirable that the pitch of the auxiliary magnetic poles be ½ of the pitch of the rotor magnetic poles. The number of the auxiliary magnetic poles should preferably be equal to the number of the stator magnetic poles at most.

Using the diskette of the present invention having the aforementioned construction, the generating output of a permanent magnet generator is increased more than twofold and the revolution of the generator rotor is increased about sixfold via a rotation transmitting mechanism. Thus, the output of the generator is increased about six times as high as the conventional type of generator. This generator in which cogging torque is reduced can achieve a large generating output and ensure smooth generator rotation because its rotating torque does not exceed the allowable maximum torque of the floppy disk drive even when the rotation of the rotor is increased sixfold by the rotation transmitting mechanism.

DETAILED DESCRIPTION OF THE PREFERRED EMBODIMENTS

Figure 1:
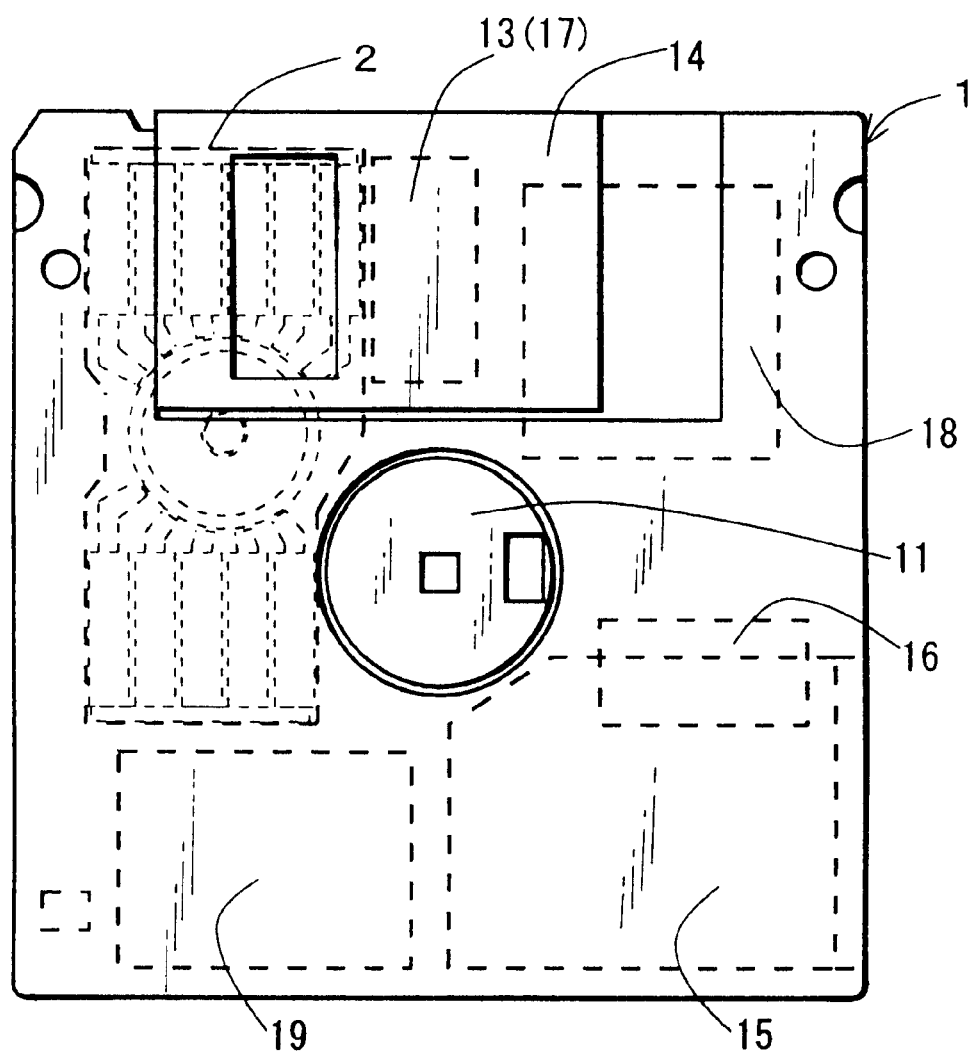
FIG. 1 is a plan view of a diskette incorporating a permanent magnet generator according to a first embodiment of the present invention.
Figure 2:
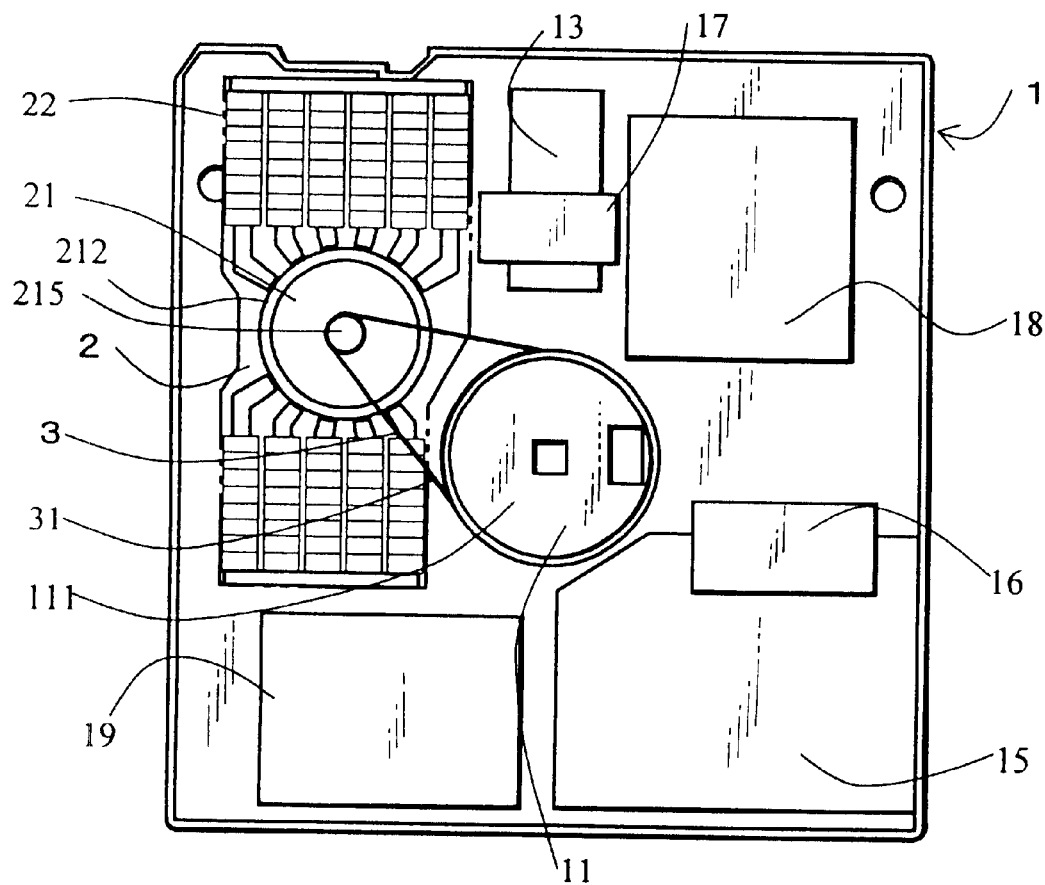
FIG. 2 is a plan view of a diskette incorporating a permanent magnet generator according to the first embodiment of the present invention, with the rear plate thereof removed.

First, the construction of a permanent magnet generator and a diskette incorporating it according to the present invention will be described in the following. Although the following description is focused on a diskette that can be loaded on a 3.5" floppy disk drive, it is needless to say that the present invention can be applied to a diskette of other sizes and constructions, as is evident from the following description. A 3.5" diskette (what is normally called 3.5" floppy disk) 1 has such a construction as shown in a plan (bottom) view of FIG. 1, encased in a plastic case of 94 mm in length, 90 mm in width and 3.5 mm in thickness. A plan view of the diskette, with the rear plate thereof removed, is shown in FIG. 2. On one end of the case provided is a head slot 13 through which an input/output magnetic head can contact the disk. On the front end of the case provided is a sliding cover 14 that covers the head slot and can be slid open by the floppy disk drive. A hub 11 for transmitting the rotation of the drive shaft of the floppy disk drive is provided almost at the center of the case. A floppy disk would be fitted coaxially to the hub so that it could rotate together with the hub.

In the diskette 1 incorporating a permanent magnet generator according to a first embodiment of the present invention, a hub 11 in the middle of the diskette 1, a permanent magnet generator 2 and a rotation transmitting mechanism 3 are incorporated in the diskette 1. The rotation of the hub 11 is increased by the rotation transmitting mechanism 3 and transmitted to a rotor 21 of the generator 2. The rotor 21 of the generator has a ring-shaped permanent magnet 212 that can be rotated around the rotating shaft of the rotor 21. A stator 22 of the generator 2 is provided on the outer circumference of the rotor permanent magnet 212 with a magnetic gap between the stator and the outer circumferential surface of the permanent magnet 212. The diskette shown in FIG. 2, which is used as an input/output device for a memory card, has a space 15 for inserting a memory card and a card contact terminal 16 for exchange of information with the memory card. A input/output terminal 17 for exchange of information between the diskette and the magnetic head of the floppy disk drive is provided near the head slot 13 through which the magnetic head accesses the disk. A CPU 18 for processing information between the input/output terminal 17 and the card contact terminal 16 is provided as necessary. The permanent magnet generator 2, which is used as a drive power source for driving the CPU 18 and the card contact terminal 16, requires rectified and stabilized power because the electric power generated by the generator may sometimes contain ripples, etc. A stabilizing power supply circuit 19 is therefore incorporated in an output line of the generator 2 provided in the diskette.

The rotor 21 of the permanent magnet generator 2 is caused to rotate as the rotating shaft thereof is rotated by the hub 11 that is engaged with the drive shaft of the floppy disk drive. In the case of a 3.5" floppy disk drive, the drive shaft thereof is normally rotated at 300 rpm. As the hub 11 is engaged with the drive shaft of the floppy disk drive in this way, the construction of the portion at which the hub 11 is engaged with the drive shaft should preferably be the same as that of the hub of a normal diskette.

The present invention uses a speed increasing mechanism as the rotation transmitting mechanism 3, and the desirable speedup ratio is twofold to tenfold. When the rotation of the hub 11 is 300 rpm, the rotor 21 of the permanent magnet rotates at 600 rpm to 3000 rpm by making the speedup ratio twofold to tenfold. At a rotor rotation of over 600 rpm, the effect of speed increasing becomes remarkable, since power generation output is increased to over 40 mW. The speedup ratio is kept under tenfold because a speedup ratio of over tenfold requires a large rotating torque.

The rotation transmitting mechanism 3 shown in FIG. 2 has a pulley 111 that rotates together with the hub 11, and a pulley 215 that rotates together with the rotor 21; both the pulleys connected via an endless belt 31. As other types of the rotation transmitting mechanism, combinations of several gears and frictional rollers can be used.

As the memory card, a card having a size of a normal credit card, that is, 85 mm in length, 54 mm in width and 0.8 mm in thickness, as is found in IC cards and typical magnetic cards, can be used. Or, what is called the smart medium can also be used for this purpose.

FIG. 2 shows relative positions of the permanent magnet generator 2, the hub 11, the rotation transmitting mechanism 3 and the memory card housing space 15. In the figure, the rotating axis of the rotor 21 of the permanent magnet generator 2 is offset, that is, not in alignment with the rotating axis of the hub 11. By shifting the positions of the generator and the hub, the thickness of the permanent magnet generator can be increased. The memory card housing space 15 is disposed so that the space 15 does not overlap with the hub or the permanent magnet generator while lying within a plane. The memory card housing space 15 shown in the figure has a size suitable for a smart medium.

If the outer periphery of a stator yoke 221 of the permanent magnet generator is a perfect circle, the outer periphery of the stator yoke 221 could interfere with the input/output terminal, or the card contact terminal, or the hub. To cope with this, it is desirable that the outer periphery of the stator yoke 221 be of a rectangular shape by cutting away the outer periphery at these portions, or removing the parts of the stator yoke that could interfere with these portions.

When the permanent magnet generator is disposed at such a location that it does not overlap with the memory card housing space within a plane, as noted above, and a diskette is assumed to have the same size as a 3.5" diskette, then the permanent magnet generator can be as thick as up to 3.0 mm to be housed in a 3.5-mm thickness of the diskette, allowing for a 0.4-mm thickness required for two diskette case covers each requiring a thickness of 0.2 mm. Furthermore, since the card having magnetic stripes, as in the case of a memory card, does not overlap the generator, a magnetic shield plate that would otherwise be needed between the space for a conventional type of memory card and the generator can be eliminated, thus preventing the risk of the lowered magnetic force resulting from the short-circuiting of magnetic force lines in a permanent magnet used for the rotor of a generator.

Needless to say, if the diskette used is a little thicker than a 3.5" diskette, 4.0 to 4.5 mm, for example, the thickness allowed for the generator would be 3.5 to 4.0 mm.

Figure 3:
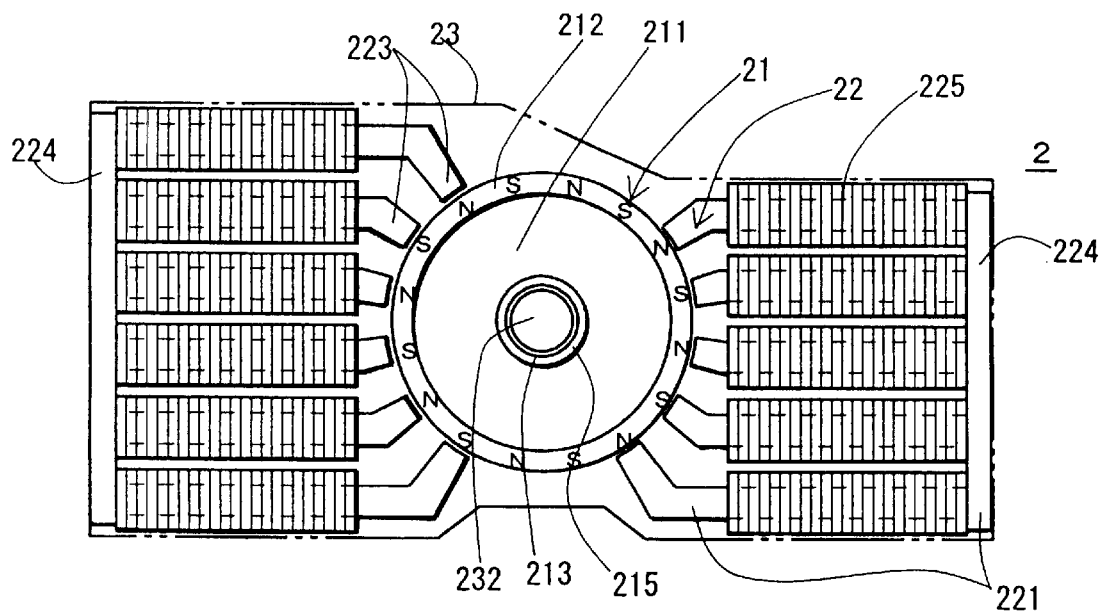
FIG. 3 is a plan view of a permanent magnet generator used in the first embodiment of the present invention.

FIG. 3 shows a plan view of a permanent magnet generator 2 used in the first embodiment of the present invention. The permanent magnet generator 2 is disposed in a housing 23 provided between the front and rear plates of a diskette case. The generator comprises a flat-disc-shaped rotor 21 disposed at the center thereof and a flat-disc-shaped stator 22 disposed on the outer periphery of the rotor, with a magnetic gap between the stator and the rotor outer periphery; both the stator 22 and the rotor 21 forming a flat disc-shaped assembly. The flat-disc-shaped stator 22 is fixedly fitted to the inside of the housing 23. A shaft 232 for supporting the rotor 21 is provided at the center of the housing 23. A hub 211 of the rotor 21 is supported by an oil-impregnated bearing 213 manufactured by sintering copper alloy powders so that the hub 211 can be rotated with respect to the shaft 232. A driven pulley 215 is coaxially fitted to the hub 211. To the outer periphery of the hub fixedly fitted is a ring-shaped permanent magnet 212 that is rotatable together with the hub. The permanent magnet 212 has a plurality of magnetic poles on the outer circumferential surface thereof, as shown in a perspective view of FIG. 4; the magnetic poles being arranged in alternately different polarities, such as NSNS - - - , in the circumferential direction.

The stator 22 has stator magnetic poles on an end thereof at such locations that the stator magnetic poles can face the rotor magnetic poles via magnetic gaps, and a plurality of magnetic pole teeth 223 extending outwardly from the stator magnetic poles. To the outer ends of the magnetic pole teeth fixedly fitted are back yokes 224.

The magnetic resistance between the back yokes 224 connecting the outer ends of the magnetic pole teeth 223 and each of the magnetic pole teeth 223 should be as low as possible. In a preferred embodiment of the permanent magnet generator 2 of the present invention, stator yokes 221 having magnetic pole teeth 223 which protrude integrally from the back yokes 224 and extend toward the outer circumferential surface of the rotor are used. When such stator yokes 221 are used, assembly work can be facilitated since previously wound stator coils 225 can be inserted from the inside of the magnetic pole teeth 223.

Both the magnetic pole teeth 223 and the back yokes 224 of the stator 22 are made of soft magnetic material. Since a magnetic material having a high saturation magnetic flux density Bs is favorable because the cross-sectional area of components and accordingly the size of the generator can be reduced, soft iron, electrical soft iron, iron dust core having a saturation magnetic flux density of over 1.2T, or silicon steel containing 4 to 6% Si can be used. A stator coil 225 for extracting power is wound on each magnetic pole tooth 223. The generator 2 is of a flat-disc shape as a whole, and the thickness of the thickest portion thereof must be limited to not more than 3 mm. It is therefore necessary to make the outermost diameter of the stator coil 225 wound on the magnetic pole tooth 223, that is, the thickness thereof in the direction of the rotating axis, less than 3 mm.

When a smart medium that is smaller than an IC card is used as the memory card, arrangement can be made to prevent the memory card housing space 15 and the generator 2 from being overlapped, as described earlier. The thickness of the generator in the direction of the rotating axis (including the speed increasing mechanism) can therefore be increased up to about 3 mm. When an IC card etc. are used as the memory card, the generator has to inevitably overlap the card housing space. In such a case, the thickness of the generator in the direction of the rotating axis becomes not more than 2 mm.

As the permanent magnet 212 used in the rotor 21, a ring-shaped permanent magnet is desirable. The permanent magnet 212 is fixedly fitted to the outer periphery of the hub 211 using an adhesive etc. This ring-shaped permanent magnet has an appropriate length in the direction of the rotating axis, that is, a thickness. The thickness of the permanent magnet should preferably be 3.0 mm at most, and more preferably 1.0 to 2.5 mm, though the practicable thickness range is 0.8 to 3.0 mm. It is apparent, however, that this size can vary, depending on the dimensions of the diskette used, or the construction of equipment to be incorporated. The permanent magnet 212 has magnetic poles exposed to the outer periphery thereof, as can be seen in a perspective view of FIG. 4.

Figure 5A:
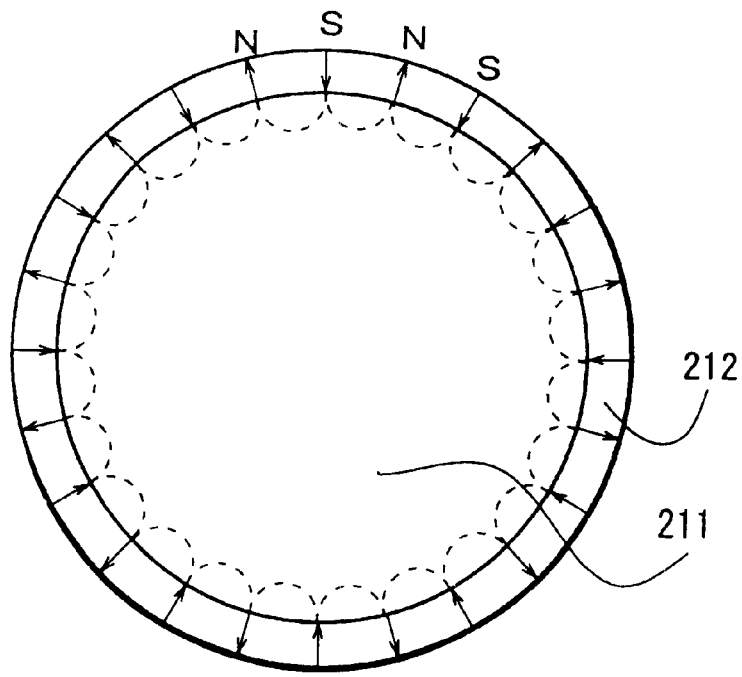
FIG. 5 is a diagram of assistance in explaining the magnetization of the permanent magnet used in the present invention with FIG. 5A being a radially anisotropic magnet and FIG. 5B being a polar-anisotropic magnet.
Figure 5B:
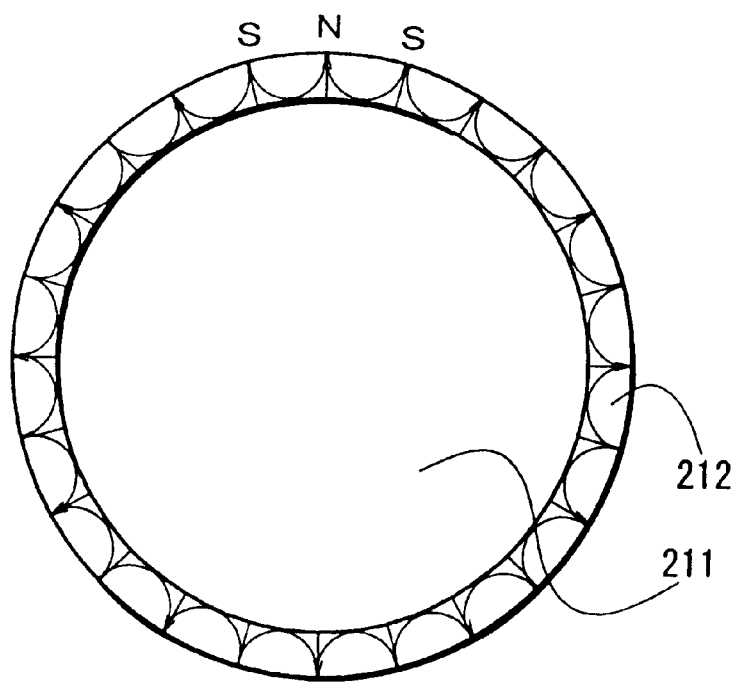

The thickness in the direction of magnetization of the ring-shaped permanent magnet 212 should preferably be as high as possible in terms of magnetomotive force. When the permanent magnet has a radial anisotropy as shown in FIG. 5A, a hub made of a ferromagnetic material allows magnetic force lines entering in the radial direction of the magnet from an adjacent magnetic pole on the circumferential surface to be connected to the magnetic force lines entering in the radial direction from the magnetic pole of an opposite polarity in the hub 211 made of the ferromagnetic material. When the magnet has a polar anisotropy as shown in FIG. 5B, magnetic poles of opposite polarities are connected to each other inside the magnet by magnetic force lines. In either case, the radial thickness of the permanent magnet 212 may be not less than $\frac{1}{3}$ to $\frac{1}{4}$ of the distance between magnetic poles, and the desirable thickness of the magnet 212 should preferably be not less than 2 mm.

Figure 6:
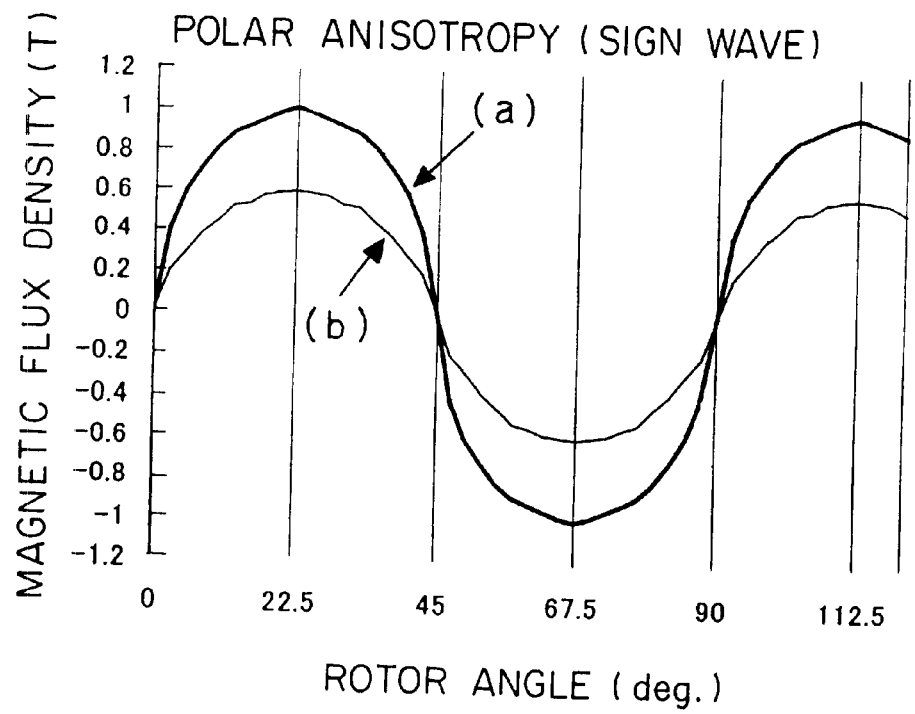
FIG. 6 is a diagram showing magnetic flux distribution on the rotor surface of the permanent magnet used in the present invention.
Figure 7:
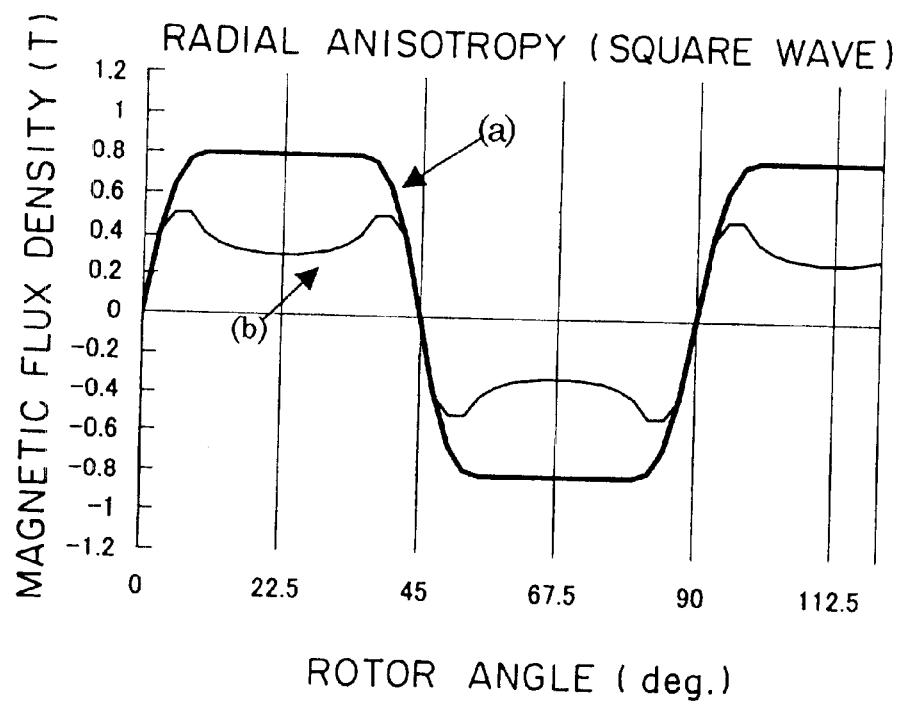
FIG. 7 is a diagram showing magnetic flux distribution on the rotor surface of the permanent magnet used in the present invention.

As for the characteristics of the permanent magnet, the distribution of magnetic flux density over the circumferential surface of the rotor should preferably be approximately a sine curve. The magnetic flux density distribution can be measured by scanning the circumferential surface of the magnetized rotor permanent magnet with a gauss meter probe. The magnetic flux density distribution in a closed magnetic path can also be measured by combining the rotor with the stator, placing the probe of a gauss meter on the stator, and causing the rotor to rotate. Measurement results obtained without the use of the stator are the magnetic flux density distribution in an open magnetic path. FIG. 6 shows an example of the magnetic flux density distribution over the circumferential surface of the rotor, which gives approximately a sine curve; (a) being measurement results in a closed magnetic path, and (b) being measurement results in an open magnetic path. FIG. 7 shows an example of the magnetic flux density distribution having a square-wave curve; (a) being measurement results in a closed magnetic path, and (b) being measurement results in an open magnetic path.

Where the magnetic flux density distribution gives an almost sine curve, as shown in FIG. 6, the cogging torque of the rotor becomes small because there are no sharp changes in magnetic flux density between the magnetic poles of the rotor.

To ensure that magnetic flux density distribution invariably gives approximately a sine curve, the permanent magnet used should be isotropic or polar-anisotropic. In an isotropic or anisotropic permanent magnet, areas around the center of the adjoining magnetic poles on the circumferential surface are magnetized most strongly, with magnetization gradually reduced at locations farther away from the center. Magnetization develops as if there is the magnetization reversal point (at which the radial components of magnetic flux density becomes almost zero) at the center of two magnetic poles of different polarities. That is, the magnetic flux density distribution is approximately a sine curve. Since the attracting force of the stator and rotor magnetic poles is determined by this magnetic force, cogging torque can be reduced when the magnetic flux density distribution is a sine curve.

In a radial-anisotropic permanent magnet, on the other hand, cogging torque is increased because the magnet exhibits a magnetic flux density distribution being a square-wave curve as shown in FIG. 7.

Figure 8:
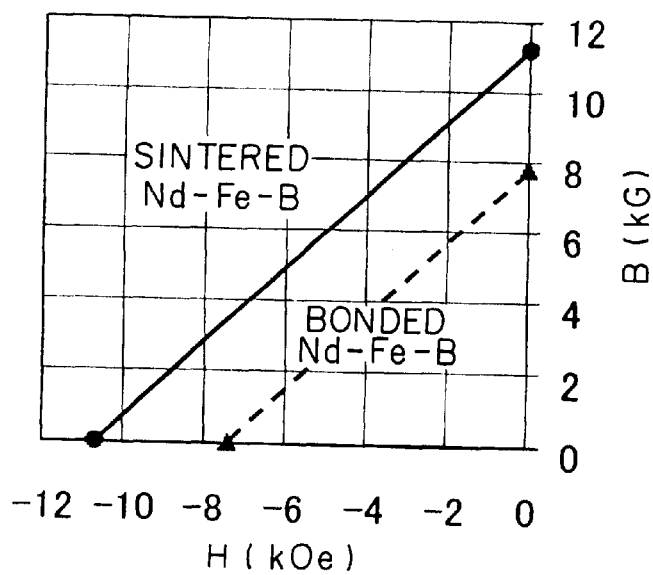
FIG. 8 is a magnetic characteristic diagram of the permanent magnet used in the present invention.

When considering the magnitude of magnetic flux density and coercive force, the sintered magnet, particularly the sintered NdFeB magnet is desirable. Magnetic characteristics of the bonded NdFeB magnet are about ⅔ of those of the bonded NdFeB magnet, as shown in FIG. 8. Although the cylindrical sintered NdFeB magnet is either of radial anisotropy (FIG. 5A) or of polar anisotropy (FIG. 5B), the most desirable is the polar-anisotropic sintered NdFeB magnet.

Where the rotor of a higher revolution and accordingly of a higher output can be obtained, as in the case of the present invention, however, the bonded NdFeB magnet can also be used. In such a case, a permanent magnet generator of low cost and low cogging torque can be obtained.

In addition to NdFeB magnets, (1) nitride magnets, such as SmFeN magnets, (2) magnets containing SmFeN and α iron, often referred to as exchange spring magnets, and magnets containing NdFeB and α iron, magnets containing NdFeB and $Fe_3B$, etc., (3) HDDR (hydrogenation, decomposition, dehydration and recombination) magnets of NdFeB, SmFeB and others, and (4) SmCo magnets can be used as a permanent magnet for the permanent magnet generator of the present invention, depending on required properties.

Figure 4:
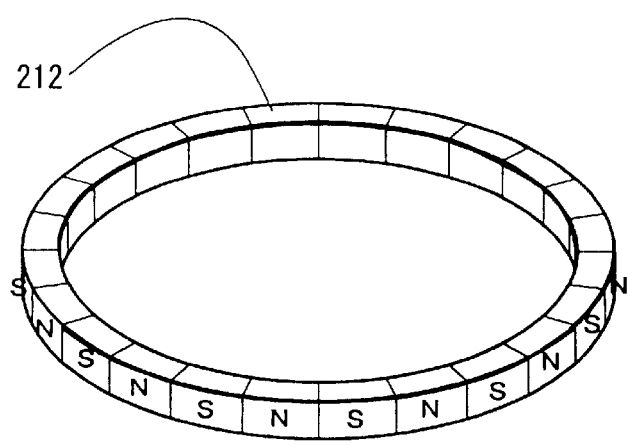
FIG. 4 is a perspective view of a permanent magnet used in the present invention.

Although FIGS. 4 and 5A to 5B show a ring-shaped permanent magnet 212 having 24 magnetic poles on the outer circumferential surface thereof, the number of magnetic poles in the present invention should preferably be 12 to 24 poles, and more preferably 16 to 20 poles. With decreases in the number of magnetic poles, the amount of flux per pole increases, but a generator having a permanent magnet having 16 to 24 poles generates the highest output. With increases in the number of magnetic poles, on the other hand, the space between the stator magnetic pole teeth extending outward in the radial direction becomes smaller. Moreover, the manufacture of the stator becomes more difficult, and distortions may be caused in the output voltage waveform. Thus, the most desirable number of magnetic poles is 16 to 20.

The magnetic poles of the outwardly extending stator magnetic pole teeth should preferably be disposed at the same angular intervals so that they can face those of the rotor permanent magnet via magnetic gaps.

The thickness of the magnetic poles of the radially extending stator magnetic pole teeth 223 must be smaller than the axial length, that is, the thickness of the permanent magnet 212. By making the thickness of the stator magnetic pole teeth 223 smaller than the thickness of the permanent magnet, a larger output can be generated by the generator 2. The thickness of magnetic poles of the stator magnetic pole teeth 223, however, must have a thickness enough not to be saturated by magnetic force lines generated by the permanent magnet 212. This is because as much magnetic lines as possible must be introduced into the outwardly extending magnetic pole teeth 223 constituting the stator 22, and the magnetic flux density in the magnetic pole teeth must be increased. When comparing the magnetic flux density caused from the permanent magnet 212 with the saturation magnetic flux density of the stator 22, the saturation magnetic flux density of a stator 22 made of soft magnetic material is not less than 1.2 T, while even a permanent magnet 212 made of a sintered NdFeB magnet having the strongest magnetic force has a magnetic flux density of about 1.0T at the working point because its residual magnetic flux density is 1.2 to 1.3T. Since the permanent magnet used in the rotor of the permanent magnet generator in an embodiment of the present invention, which will be described later, has a permeance coefficient of 2 before incorporated into the generator, and about 5 after incorporated, its maximum magnetic flux density is 1.02T. The magnetic flux density passing in the magnetic pole teeth 223 is increased by reducing the thickness of the radially extending magnetic pole teeth 223 of the stator 22 to reduce the cross-sectional area thereof. When a sintered NdFeB magnet is used as the rotor permanent magnet and a stator 22 having a saturation magnetic flux density of not less than 1.2T is used, the magnetic pole teeth 223 having a thickness that is 30 to 70% of the thickness of the permanent magnet are desirable.

As a stator coil 225 is wound on the radially extending magnetic pole tooth 223, electromotive force is generated in the stator coil 225 by alternating magnetic field in the magnetic pole tooth. The stator coil 225 wound on each magnetic pole tooth 223 should preferably be connected in series to each other. The desired wire diameter of the stator coil 225 is 0.1 to 0.25 mm, more preferably 0.12 to 0.18 mm, but the diameter of the coil 225 should be as large as practicable to minimize the resistance of the stator coil 225.

The stator 22 shown in a plan view of FIG. 3 has magnetic pole teeth 223 on the left and right portions thereof in the figure, but does not have any magnetic pole teeth on the upper and lower portions thereof. The magnetic pole teeth on the upper and lower portions are eliminated in this permanent magnet generator, in which an input/output terminal 17 and a hub 11 are provided, as in the case of the diskette 1 shown in FIG. 1, to prevent interference with the input/output terminal 17, the hub 11 and the end wall of the diskette. The remaining magnetic pole teeth 223, however, are disposed at substantially equal intervals so as to be able to face the magnetic poles of the rotor permanent magnet 212. The number of stator magnetic pole teeth cut off the potentially interfering magnetic pole teeth, if any, would be at least one pole, or normally two to three poles.

Figure 9:
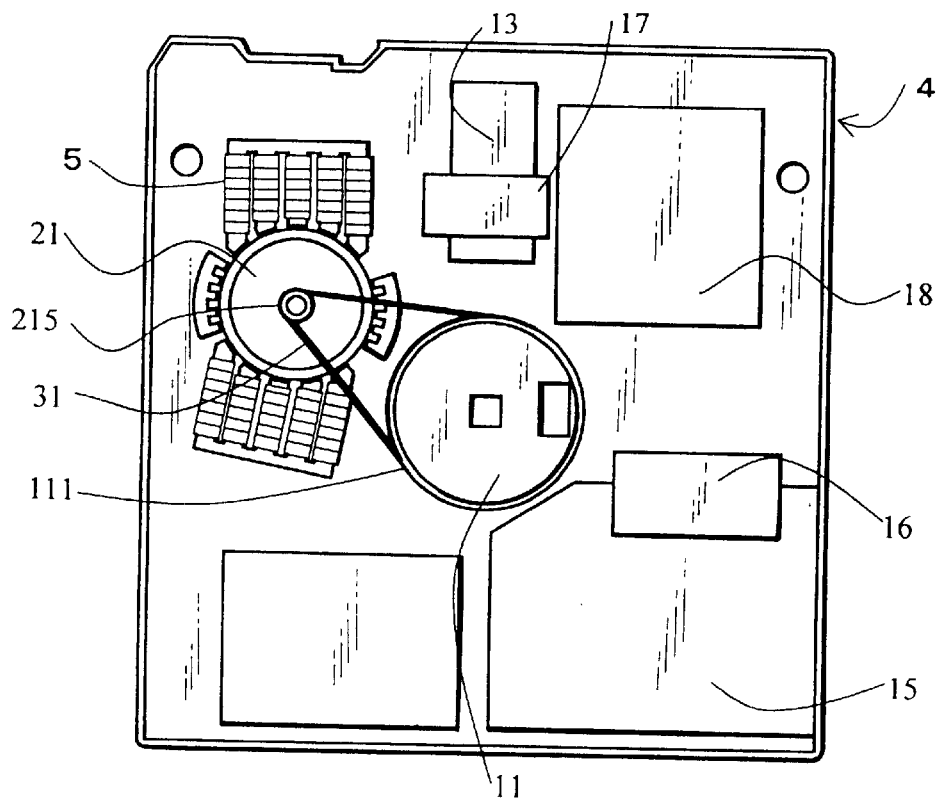
FIG. 9 is a plan view of a diskette incorporating a permanent magnet generator according to a second embodiment of the present invention, with the rear plate thereof removed.

FIG. 9 is a plan view of a diskette 4 incorporating a permanent magnet generator according to the second embodiment of the present invention, with the rear plate thereof removed. The diskette 4 shown in the figure is essentially the same as that shown in FIGS. 1 and 2, and like parts are indicated by like reference numerals in the figure. The permanent magnet generator 5 shown in this figure is also shown in a plan view of FIG. 10. The rotation transmitting mechanism 3 is the same as that shown in FIG. 2, and comprises a pulley 111 that rotates together with the hub 11, and a pulley 215 that rotates together with the rotor 21; both the pulleys connected by an endless belt 31. The desirable speedup ratio of the rotation transmitting mechanism 3 is twofold to tenfold.

Figure 10:
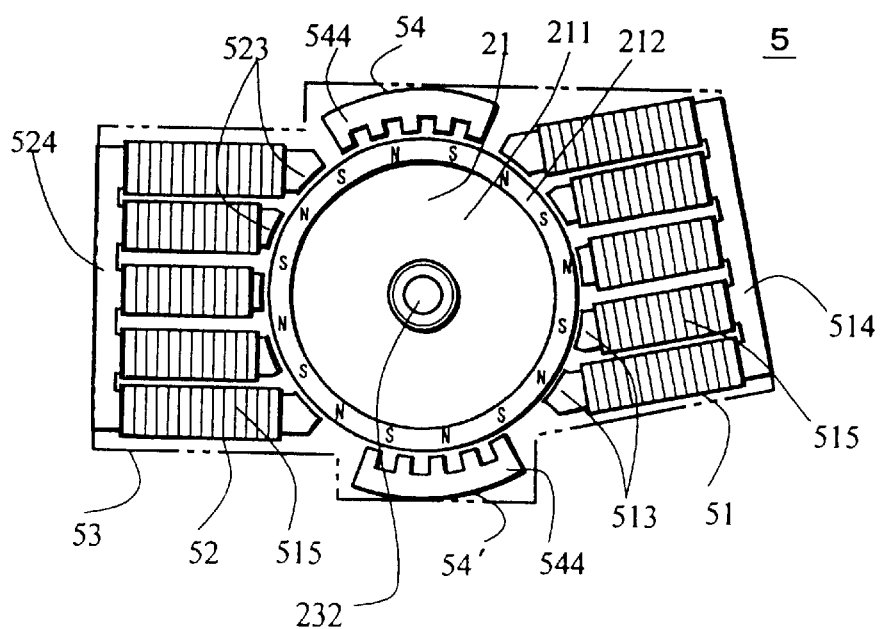
FIG. 10 is a plan view of a permanent magnet generator used in the second embodiment of the present invention.

The permanent magnet generator 5 shown in FIG. 10 is disposed in a housing 53 provided between front and rear plates of a diskette case. The generator 5 comprises a flat-disc-shaped rotor 21 provided at the center thereof, and a flat-disc-shaped stator provided on the outer periphery of the rotor with a magnetic gap; both the stator and the rotor 21 forming a flat-disc-shaped assembly. The flat-disc-shaped stator is fixedly fitted to the inside of the housing 53. A shaft 232 for supporting the rotor 22 is provided at the center of the housing 53. A hub 211 of the rotor is adapted so that the hub 211 can be rotated with respect to the shaft 232. Since the construction of the rotor is the same as that used in the first embodiment, detailed description of the rotor is omitted here. As noted earlier, the permanent magnet 212 of the rotor 21 has a plurality of magnetic poles on the outer circumferential surface thereof, and the magnetic flux density distribution produced by these magnetic poles should preferably give approximately a sine curve as shown in FIG. 6.

The stator has a first magnetic pole tooth group comprising a plurality of magnetic pole teeth on the right side of the rotor 21 in FIG. 10, and a second magnetic pole tooth group 52 comprising a plurality of magnetic pole teeth on the left side of the rotor 21. In the figure, each magnetic pole tooth group has five magnetic pole teeth. The five magnetic pole teeth in the first magnetic pole tooth group are arranged in almost parallel with each other, and a stator coil 515 is wound on each magnetic pole tooth. Each magnetic pole tooth has on an end thereof a stator magnetic pole 513, and the magnetic poles 513 of the first group 51 are disposed at such locations that the magnetic poles 513 can face the rotor magnetic poles simultaneously via magnetic gaps. The opposite ends of the magnetic pole teeth are connected to each other by a back yoke 514. The five magnetic pole teeth of the second magnetic pole tooth group 52 are also arranged in almost parallel with each other, and a stator coil 515 is wound on each magnetic pole tooth. Each magnetic pole tooth has on an end thereof a stator magnetic pole 523, and the magnetic poles 523 of the second group 52 are disposed at such locations that the magnetic poles 523 can face the rotor magnetic poles simultaneously via magnetic gaps. The opposite ends of the magnetic pole teeth are connected to each other by a back yoke 524.

In this arrangement, the stator magnetic poles 513 of the first group 51 are shifted about 90 degrees in electrical angle from the stator magnetic poles 523 of the second group 52 with respect to the rotor magnetic poles. That is, when the magnetic poles 513 of the first group 51 face the rotor magnetic poles, the magnetic poles 523 of the second group 52 face the spaces between the rotor magnetic poles. This means that half of the total stator magnetic poles are shifted from the remaining stator magnetic poles since the five stator magnetic poles are shifted. It is desirable that almost half of the total stator magnetic poles be shifted about 90 degrees from the remaining half so as to reduce cogging torque.

Since the cogging torque in total produced by the magnetic poles of the first and second groups 51 and 52 is reduced due to the offsetting effect of the magnetic poles of any one group shifted about 90 degrees from those of the other group, too many magnetic poles in any one group could lessen the cogging torque reducing effect. A slight increase in the number of magnetic poles in any one group can be tolerated, however.

In FIG. 10, auxiliary magnetic poles 54 and 54' are provided at portions where no stator magnetic poles face the outer periphery of the rotor. Each of the auxiliary magnetic poles is disposed at such a location as to face the rotor magnetic poles with a magnetic gap. A plurality of auxiliary magnetic pole teeth are connected to each other on the opposite side ends by back yokes 544. No stator coils are wound on these auxiliary magnetic poles.

It is desirable that the auxiliary magnetic poles 54 and 54' should have half the period of main stator magnetic poles (stator magnetic poles of the first and second groups on which coils are wound) 513 and 523, that is, the pitch of the auxiliary magnetic poles be half the pitch of the rotor magnetic poles (that is the same as the pitch of the main stator magnetic poles).

The resulting torque obtained from combination of the cogging torque of the stator magnetic poles 513 and 523 of the first and second groups has half the period of the stator magnetic poles or the rotor magnetic poles since the magnetic poles 513 and 523 are shifted about 90 degrees from each other. By making the pitch of the auxiliary magnetic poles 54 and 54' half the pitch of the stator magnetic poles 513 and 523, the cogging torque of the auxiliary magnetic poles can reduce the total cogging torque of the stator magnetic poles. It is desirable therefore that the number of the auxiliary magnetic poles 54 and 54' be almost the same as the number of the main stator magnetic poles so that the cogging torque of the auxiliary magnetic poles can offset the resulting cogging torque generated by the main stator magnetic poles. It should be noted that the number of auxiliary magnetic poles should be at least equal to the number of the main stator magnetic poles, though the number of the auxiliary magnetic poles 54 and 54' can be determined taking into account the magnitude of the cogging-torque allowed for the generator rotor.

Figure 11:
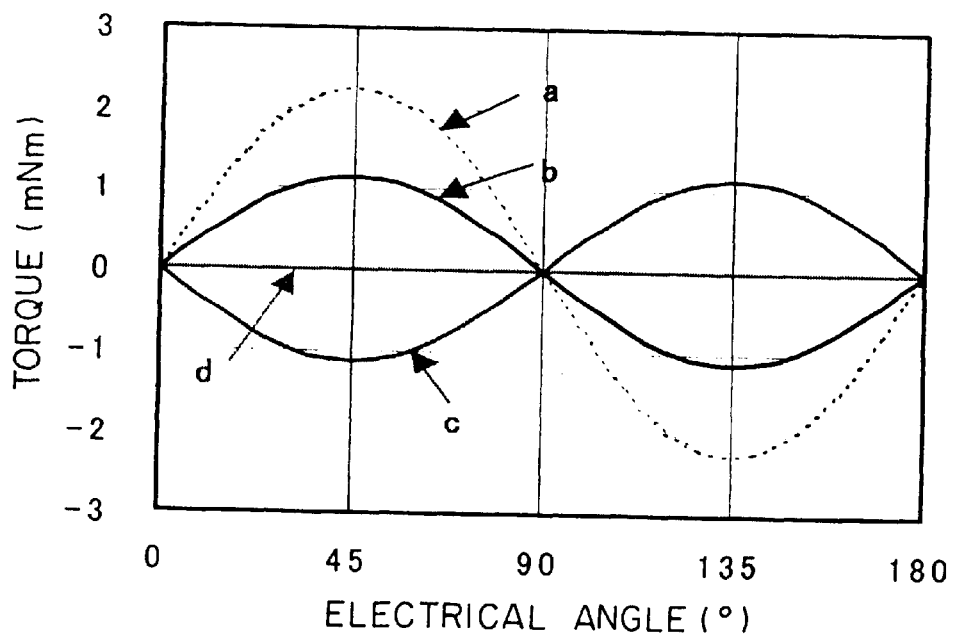
FIG. 11 is a graph of assistance in explaining an ideal cogging torque in the permanent magnet generator shown in FIG. 10.
Figure 12:
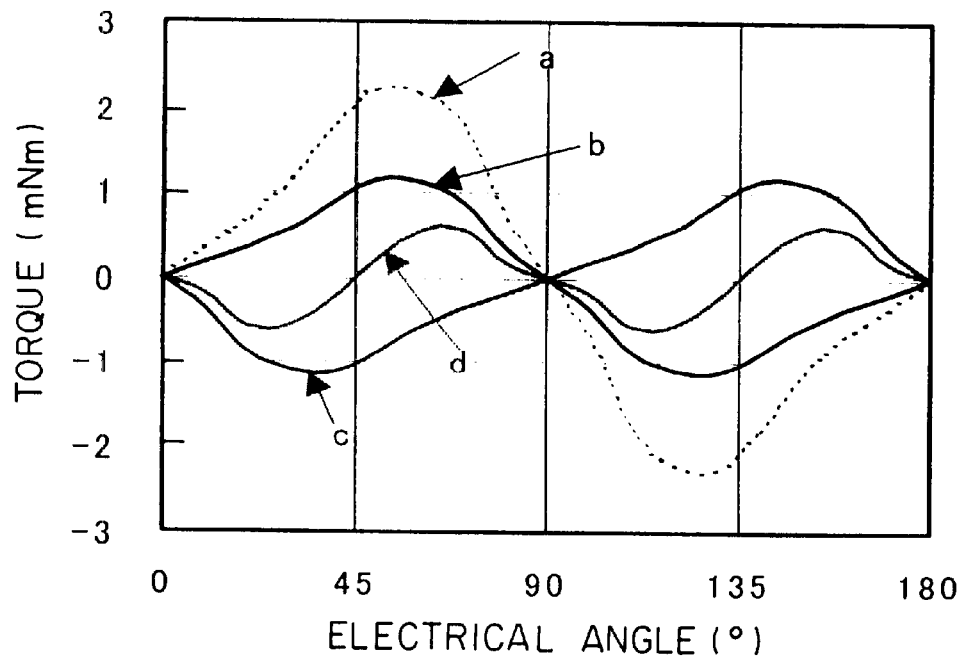
FIG. 12 is a graph of assistance in explaining a realistic cogging torque in the permanent magnet generator shown in FIG. 10.

Cogging torque in the permanent magnet generator shown in FIG. 10 will be described in the following. FIG. 11 is a graph of assistance in explaining an ideal cogging torque, FIG. 12 a graph of assistance in explaining a realistic cogging torque, and FIG. 13 a graph of assistance in explaining the case where cogging torque is reduced using auxiliary magnetic poles.

If the assumption is made that all the stator magnetic poles 513 and 523 of the first and second groups face the rotor magnetic poles simultaneously, cogging torque ideally gives a sine curve, as shown by curve a in FIG. 11. The maximum torque at this time is assumed to be 2.25 mNm using the maximum torque measured with a generator according to the present invention which was manufactured in such a manner that all the stator magnetic poles of the first and second groups face the rotor magnetic poles simultaneously. When a generator as shown in FIG. 10 is prepared in such a manner that with the five-pole stator magnetic poles 513 of the first group left as they are, the five-pole stator magnetic poles 523 of the second group are shifted 90 degrees in electrical angle from the stator magnetic poles 513, the cogging torque produced by the five-pole stator magnetic poles of the first group gives a curve that has the same phase as curve a, and half the amplitude of curve a, as shown by curve b in FIG. 11. The cogging torque produced by the five-pole stator magnetic poles of the second group, which are shifted 90 degrees from those of the first group, becomes curve c in FIG. 11. Since curves b and c are shifted 90 degrees from each other, the cogging torque represented by curve d that is obtained as the result of the combination of them become zero. In this way, cogging torque can be reduced to zero by providing magnetic poles that are ideally shifted 90 degrees in electrical angle.

Although curve a in FIG. 11 is shown in the form of a sine curve, actual cogging torque may not be a curve symmetrical with respect to the line representing 45 degrees in electrical angle. Consequently, the cogging torque of a generator having the same construction where all the stator magnetic poles simultaneously face the rotor magnetic poles may become a curve a in FIG. 12. The cogging torque generated by the five-pole stator magnetic poles of the first group becomes a curve that has the same phase as curve a and half the amplitude of curve a, as shown by curve b in FIG. 12. When the five-pole stator magnetic poles of the second group are shifted 90 degrees in electrical angle from those of the first group, on the other hand, the cogging torque produced by the five-pole stator magnetic poles of the second group is shifted 90 degrees from the cogging torque curve for the first group, as shown by curve c in FIG. 12. The combined torque of curves b and c is as shown by curve d. It can be easily understood that the maximum cogging torque value can be almost halved by shifting the phase of half of the stator magnetic poles 90 degrees in electrical angle, as shown by curve d. The electrical angle to which the magnetic poles are shifted need not be precisely 90 degrees, but the accuracy of the angle may be such that the maximum cogging torque can be almost halved.

Figure 13:
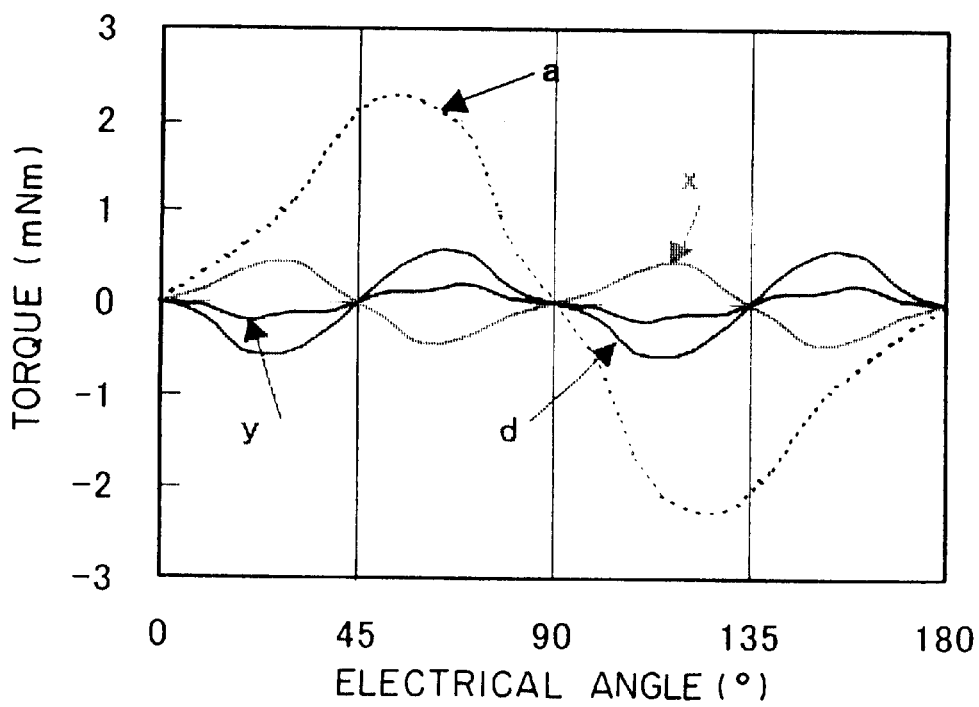
FIG. 13 is a graph of assistance in explaining a realistic cogging torque in the permanent magnet generator shown in FIG. 10 when auxiliary magnetic poles are taken into account.

The cogging torque when auxiliary magnetic poles whose pitch is half that of the main stator magnetic poles are provided is shown in FIG. 13. In the figure, curves a and d are the same as curves a and d in FIG. 12. Since the auxiliary magnetic poles have half the period of the stator magnetic poles, the period of the cogging torque is also halved, as shown by curve x in FIG. 13. As curve x is offset by the combined torque curve d, their combined torque becomes small, as shown by curve y. The cogging torque generated by the generator rotor can be reduced by determining the number and size of the auxiliary magnetic poles so that the combined torque as shown by curve y becomes smaller.

Since a generator that can reduce cogging torque as described in detail above is employed in the diskette of the present invention, the speed of the rotor can be increased, and as a result, a large generator output can be obtained by using a drive unit commonly used for floppy disk drive.

Figure 14:
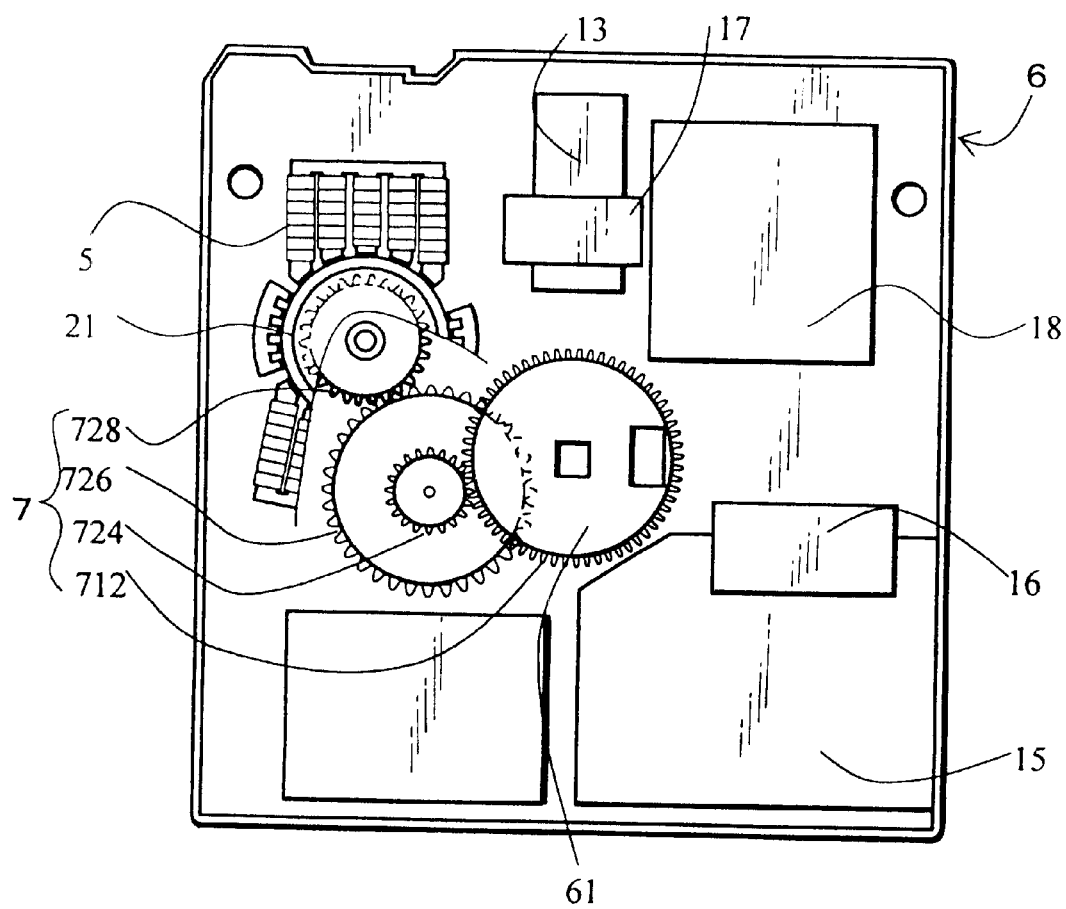
FIG. 14 is a plan view showing a diskette incorporating a permanent magnet generator according to the third embodiment of the present invention, with the rear plate removed and part of the generator cut away.

FIG. 14 is a plan view of a diskette 6 incorporating a permanent magnet generator according to a third embodiment of the present invention, with the rear plate of the diskette removed and part of the generator cut away. The diskette 6 shown in this figure is essentially the same as that shown in FIGS. 2 and 9, and like parts are indicated by like numerals in the figure. The permanent magnet generator shown in this figure has the same construction as the generator 5 shown in FIGS. 9 and 10. The rotation transmitting mechanism 7 used here comprises a gear 712 provided on the outer periphery of a hub 61 provided almost at the center of the diskette 6, a small gear 724 that is caused to rotate in mesh with the gear 712, a large gear 726 that is caused to rotate coaxially with the small gear 724, and a gear 728 that is caused to rotate in mesh with the large gear 726. The last-stage gear 728 is provided coaxially with the rotor 21 of the generator 5 to cause the rotor 21 to rotate. The revolution is increased twofold to tenfold as transmitted from the first-stage gear 712 to the last-stage gear 728. Since this speedup rotation transmitting mechanism 7 is of a well-known gear type, further explanation of the mechanism is omitted here.

Although the gear type rotation transmitting mechanism has been described here, the same effect can be expected by replacing gears with rubber rollers. It is needless to say that although the permanent magnet generator 5 shown in FIG. 9 is used in FIG. 14, it can be replaced with the permanent magnet generator 2 shown in FIG. 3.

Figure 15:
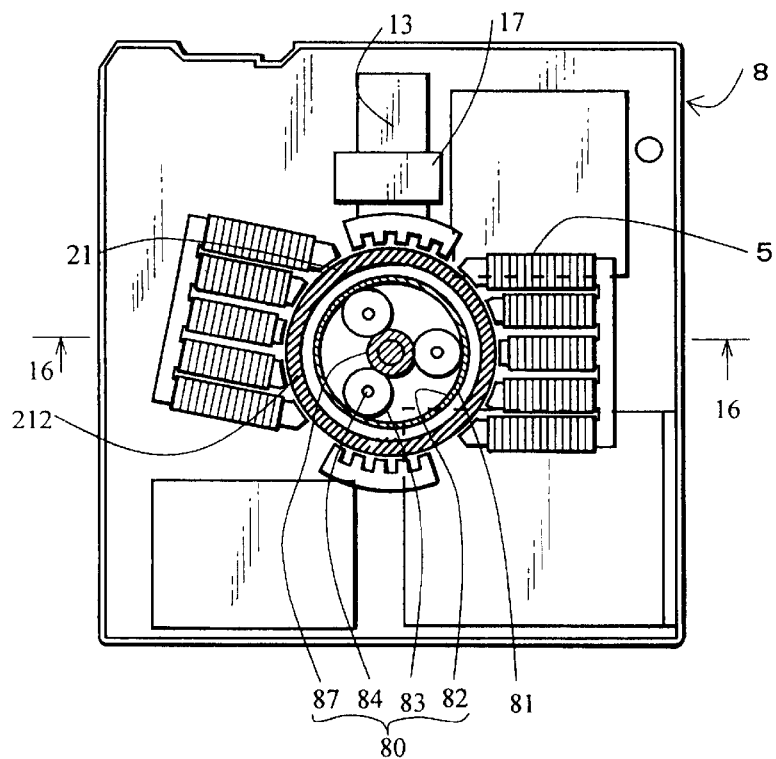
FIG. 15 is a plan view showing a diskette incorporating a permanent magnet generator according to the fourth embodiment of the present invention, with the rear plate removed.

FIG. 15 is a plan view of a diskette 8 incorporating a permanent magnet generator according to a fourth embodiment of the present invention, with the rear plate thereof removed. The diskette 8 shown in this figure is essentially the same as that shown in FIGS. 2, 9 and 14, and like parts are indicated by like numerals in the figure. The permanent magnet generator in this figure has essentially the same construction as the generator 5 shown in FIGS. 9 and 10, except that a hub 81 and a rotor 21 are provided coaxially, and that the revolution of the hub 81 is increased and transmitted to the rotor 21 via a planetary coaxial rotation transmitting mechanism 80. In this embodiment, too, the revolution of the hub 81 is increased twofold to tenfold and transmitted to the rotor 21 by the planetary coaxial rotation transmitting mechanism 80. Since the construction and operation of the permanent magnet generator 5 has been described in detail earlier, its further explanation is omitted here.

Figure 16:
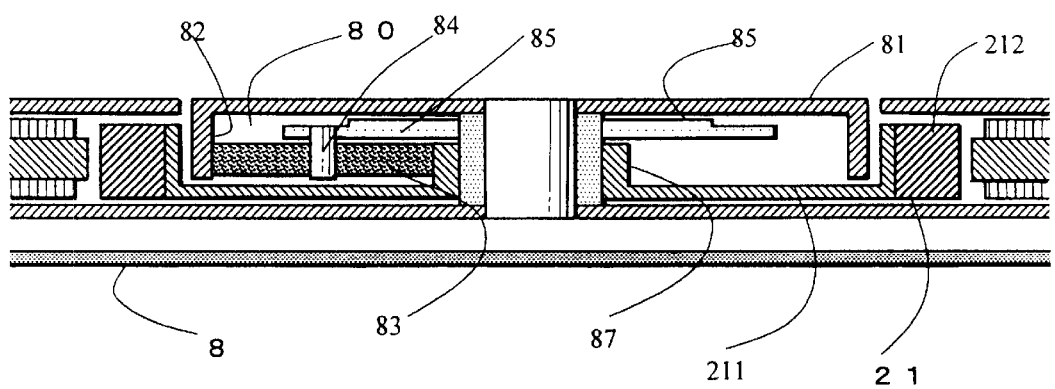
FIG. 16 is an enlarged view of the cross section of a planetary coaxial rotation transmitting mechanism on the diskette according to the fourth embodiment of the present invention, taken substantially along line 16—16 in FIG. 15.
Figure 17:
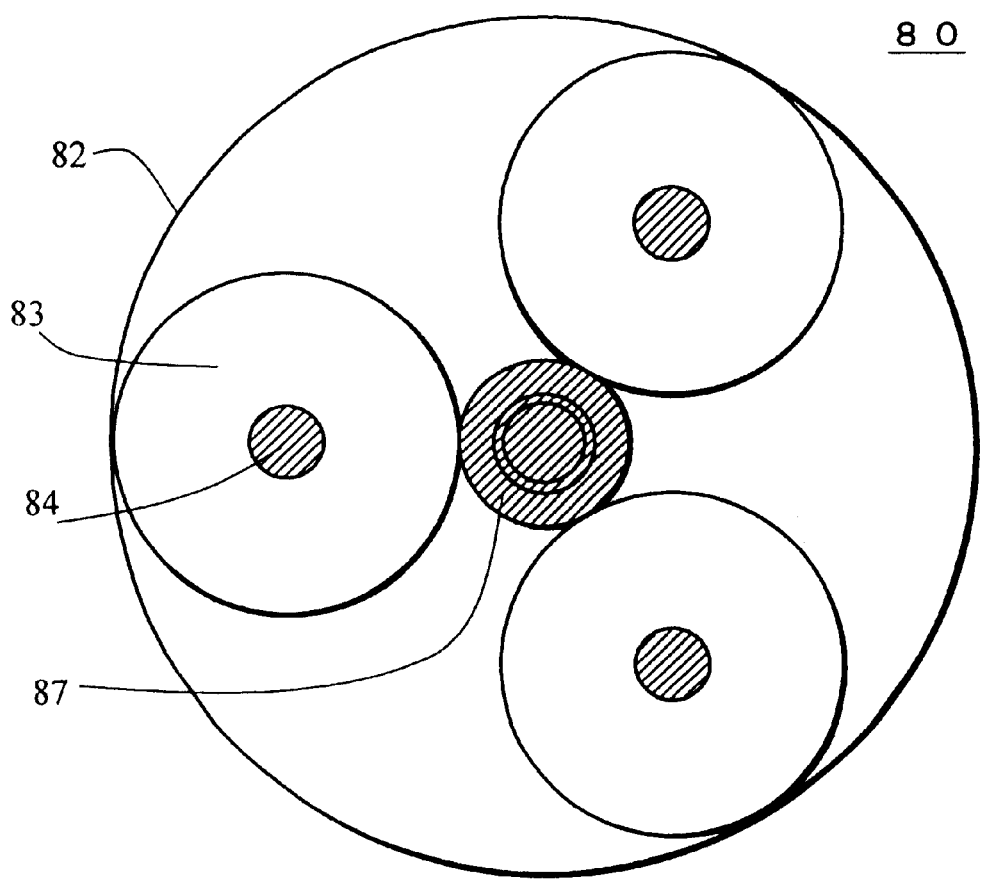
FIG. 17 is a diagram of assistance in explaining the relationship between gears (rollers) of the planetary coaxial rotation connection mechanism of FIG. 16.

FIG. 16 shows a planetary coaxial rotation transmitting mechanism 80. The mechanism 80 will be described in the following, referring to FIG. 16 which is a cross-sectional view of the mechanism 80 taken substantially along line 16—16 in FIG. 15, and FIG. 17 which is a diagram of assistance in explaining the relationship among the gears (or rubber rollers). The hub 81 has in the cylindrical inside thereof an internal gear 82 and is caused to rotate around the axis thereof by the power of the drive shaft of the floppy disk drive. The rotor 21 of the permanent magnet generator 6 is rotatable around the same axis as that of the hub 81, and has a small external gear 87 around the rotating shaft thereof. Both the external gear 87 and the ring-shaped permanent magnet 212 of the rotor 21 are integrally assembled by a boss 211 and caused to rotate together with the boss 211. In this figure, three planetary gears 83 are provided between the external and internal gears 87 and 82 to transmit the rotation of the internal gear 82 to the external gear 87. A rotating shaft 84 of the planetary gears 83 is fixedly fitted to the diskette 8 by a bracket 85.

Since the speedup ratio by the planetary rotation transmitting mechanism 80 is the ratio of the number of teeth, that is, the diameter of the internal gear 82 to the number of teeth, that is, the diameter of tile external gear 87, the speedup ratio can be increased twofold to tenfold by increasing this ratio twofold to tenfold. If the diameter of the internal gear 82 of the hub 81 is set to 20 mm and the diameter of the external gear 87 to 7 mm, for example, a planetary gear 83 of a diameter of 6.5 mm can be interposed between them to set the speedup ratio to about 2.9 times. With this arrangement, when the hub 81 is caused to rotate at 300 rpm by the drive shaft of the floppy disk drive, the revolution of the rotor 21 becomes 857 rpm.

Although description has been made in the foregoing on the assumption that all the internal, external and planetary gears 82, 87 and 83 are gears, the same effect can be expected by using rubber rollers or rubber-lined rollers.

EXAMPLES

The diskette incorporating a permanent magnet generator according to the present invention will be described in more detail and clarify the operating conditions in the following experiments.

EXAMPLE 1

Measurement results of output and cogging torque on a diskette incorporating a permanent magnet generator prepared in accordance with design specifications shown in TABLE 1 where the revolution of the rotor was increased sixfold are shown in TABLE 2. In TABLE 2, figures given in the rotor permanent magnet column and the stator permanent magnet column correspond with those in TABLE 1.

TABLE 1

| Item | Description |
|---|---|
| Diskette | 3.5" floppy disk |
| Revolution of hub | 300 rpm |

TABLE 1-continued

| Item | Description |
|---|---|
| Speed increasing mechanism | Sixfold |
| Outside dimensions of generator | 60 mm (length) × 30 mm (width) × 2 mm (thickness) |
| Dimensions of rotor | 29 mm (O.D.) × 25 mm (I.D.) × 2 mm (thickness) |
| Permanent magnet | (1) Sintered NdFeB radial-anisotropic permanent magnet<br>(2) Sintered NdFeB polar-anisotropic permanent magnet<br>(3) Bonded NdFeB isotropic permanent magnet |
| No. of poles of rotor | 16 poles |
| Material of stator | Cold-roller steel sheet SPCC<br>Saturation magnetic flux density Bs: 1.5 T |
| Thickness of stator | 2 mm |
| Magnetic poles of stator | Total 10 poles<br>(1) Five opposed pole type, with the right and left stator magnetic poles facing the rotor magnetic poles (five magnetic poles are provided each on right and left sides in FIG. 3)<br>(2) Five opposed pole type, with the stator magnetic poles of one group are shifted 90 degrees in electrical angle from the stator magnetic poles of the other group, with auxiliary magnetic poles added (stator shown in FIG. 10) |
| Stator winding | No. of turns: 300 turns/pole<br>Wire dia.: 0.14 mm<br>Winding resistance: 40 Ω (10 poles)<br>Connection: series |
| Magnetic gap | 0.2 mm on one side |

TABLE 2

| Rotor permanent magnet | Stator permanent magnet | Generator output | Cogging torque |
|---|---|---|---|
| (1) | (1) | 105 mW | 1.5 mNm × sixfold |
| (2) | (1) | 125 mW | 0.4 mNm × sixfold |
| (3) | (1) | 80 mW | 0.3 mNm × sixfold |
| (4) | (2) | 80 mW | 0.06 mNm × sixfold |

As shown in TABLE 2, the output obtained with a sintered NdFeB permanent magnet was increased remarkably, about sixfold compared with about 20 mW when the revolution was 300 rpm. With a bonded NdFeB permanent magnet, the output became as high as 80 mW.

The cogging torque with sintered NdFeB polar-anisotropic permanent magnets and bonded NdFeB permanent magnets, however, were reduced remarkably, compared with radial-anisotropic permanent magnets, to as low as not more than 2.5 mNm. Using radial-anisotropic permanent magnets, the cogging torque exhibited fairly larger.

This is attributable to that cogging torque could be reduced with polar-anisotropic and bonded permanent magnets because the magnetic flux density distribution around rotor permanent magnets gave a sine curve in these permanent magnets. Furthermore, even when the speed was increased sixfold, cogging torque could be reduced to 36 mNm by shifting half (5 poles) of the stator magnetic poles about 90 degrees, and providing the same number of auxiliary magnetic poles having half the pitch of the stator magnetic poles as the number of the stator magnetic poles. In order to have a cogging torque of not more than 2.5 mNm with a radial-anisotropic permanent; magnet, the tips of the stator magnetic pole teeth must be closed slots.

EXAMPLE 2

Figure 18:
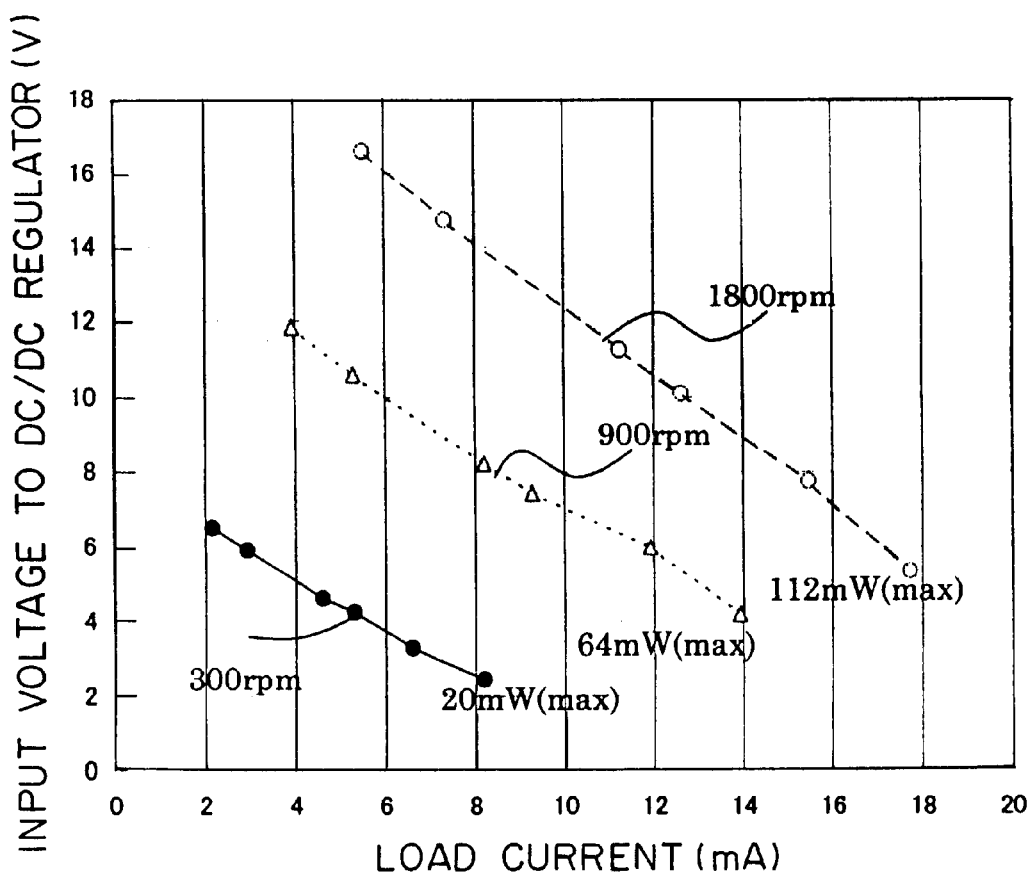
FIG. 18 is a diagram illustrating the output of the permanent magnet used in the present invention.
Figure 19A:
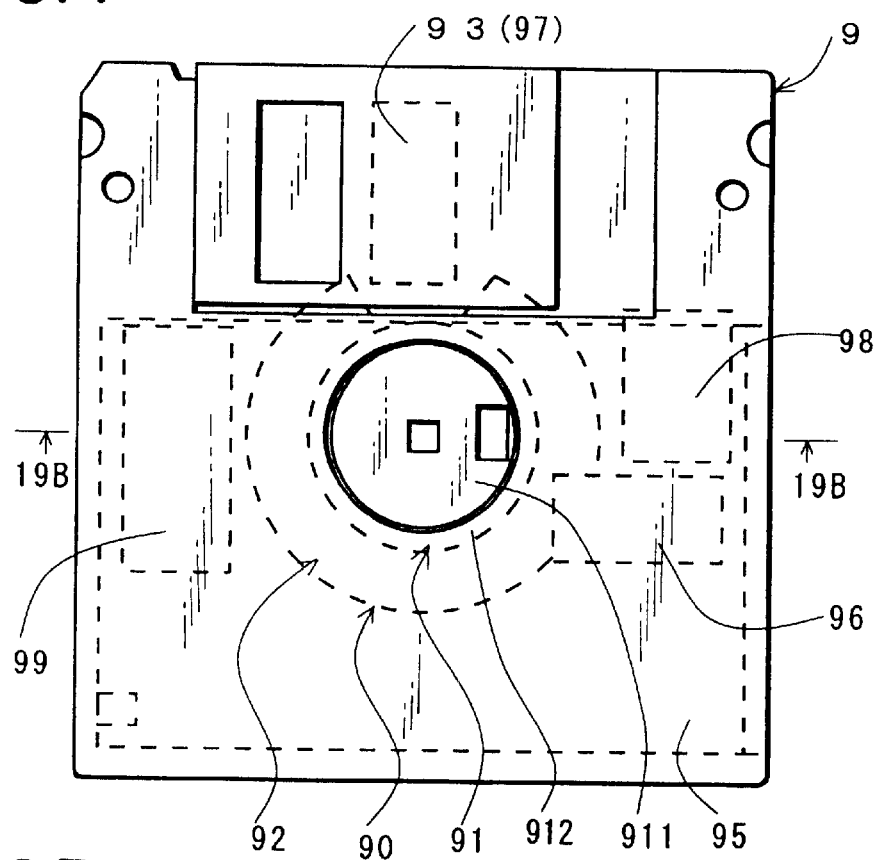
FIG. 19A being a plan view, FIG. 19B being a cross-sectional view taken substantially along line 19B—19B of FIG. 19A, and FIG. 19C being an enlarged view of the essential part of FIG. 19B.
Figure 19B:
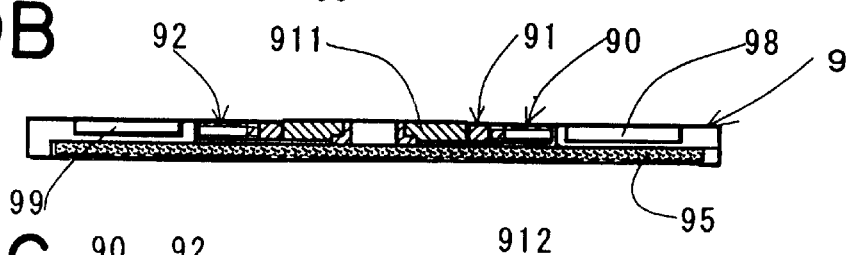
FIG. 19 is a diagram showing a diskette incorporating a permanent magnet in a previously filed patent application.
Figure 19C:
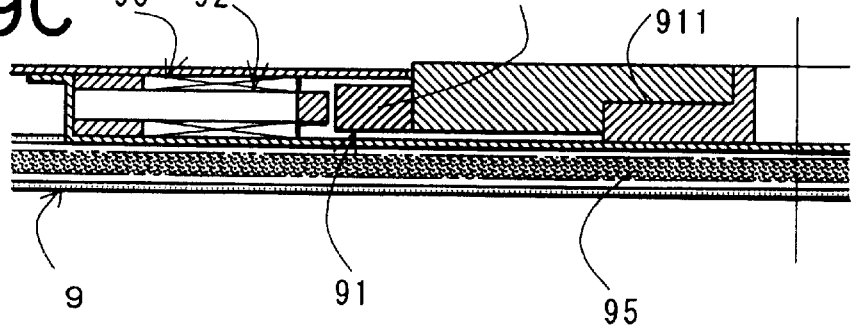

The relationship between load current and generator output when the revolution of the rotor was changed from 300 rpm to 1800 rpm with a generator having a sintered NdFeB polar-anisotropic permanent magnet used in EXAMPLE 1 is shown in FIG. 18. As is apparent from the figure, the output was increased from 20 mW at 300 rpm to 64 mW at 900 rpm, and to 112 mW at 1800 rpm.

As described above, the diskette incorporating a permanent magnet generator according to the present invention can increase the output of the generator. Thus, a larger output than that obtained with a conventional type can be achieved even when an inexpensive bonded NdFeB permanent magnet having low characteristics is used.

Furthermore, cogging torque can be reduced, and the need for making magnetic pole teeth of a closed slot type can be eliminated, and a larger output can be obtained by using a permanent magnet in which magnetic flux density on the surface of the rotor permanent magnet has a characteristic close to a sine curve, shifting the stator magnetic poles about 90 degrees in electrical angle, and using a stator having auxiliary magnetic poles.

Furthermore, the thickness of a permanent magnet generator can be increased by disposing the rotating shaft of the hub that receives rotation by engaging with the drive shaft of the floppy disk drive in an offset position with the rotating shaft of the permanent magnet generator.

What is claimed is:

1. A diskette comprising:
   a diskette case;
   a hub provided inside said diskette case that is drivable by an external drive mechanism; and
   a permanent magnet generator provided inside said diskette case, said permanent magnet generator including
   i) a rotor that is rotatably drivable by said hub, said rotor having a rotatable permanent magnet, said permanent magnet having a plurality of magnetic poles arranged on the outer periphery thereof, said magnetic poles having alternately different polarities in the circumferential direction, and
   ii) a stator having a plurality of stator magnetic pole teeth, said plurality of stator magnetic pole teeth each having a stator magnetic pole at an end thereof at a location where said stator magnetic pole can face one of said rotor magnetic poles across a magnetic gap, each of said plurality of stator magnetic pole teeth extending outwardly from said stator magnetic pole and having a stator coil wound thereon,
   wherein said rotor and said stator are formed into a flat disk shaped assembly, and a rotation transmitting mechanism for connecting said hub to said rotor of said permanent magnet generator is provided inside said diskette, and said rotation transmitting mechanism being a speed increasing mechanism.

2. A diskette as set forth in claim 1, wherein said rotation transmitting mechanism is operative to increase a speed of said rotor to be in a range of from twofold to tenfold of a speed of said hub.

3. A diskette as set forth in claim 2, wherein the gap magnetic flux density distribution of said permanent magnet generator is substantially a sine curve.

4. A diskette as set forth in claim 3, wherein said permanent magnet of said permanent magnet generator is a bonded magnet.

5. A diskette as set forth in claim 3, wherein said stator has a plurality of auxiliary magnetic poles at such locations as to be able to face said rotor magnetic poles across magnetic gaps, each of said auxiliary magnetic poles having no stator coils and being connected to each other via a back yoke made of soft magnetic material.

6. A diskette as set forth in claim 3, wherein a first group of said plurality of stator magnetic poles are shifted approximately 90 degrees in electrical angle from a second group of said plurality of stator magnetic poles.

7. A diskette as set forth in claim 6, wherein said stator has a plurality of auxiliary magnetic poles at such locations as to be able to face said rotor magnetic poles across magnetic gaps, each of said auxiliary magnetic poles having no stator coils and being connected to each other via a back yoke made of soft magnetic material.

8. A diskette as set forth in claim 2, wherein a first group of said plurality of stator magnetic poles are shifted approximately 90 degrees in electrical angle from a second group of said plurality of stator magnetic poles.

9. A diskette as set forth in claim 8, wherein said stator has a plurality of auxiliary magnetic poles at such locations as to be able to face said rotor magnetic poles across magnetic gaps, each of said auxiliary magnetic poles having no stator coils and being connected to each other via a back yoke made of soft magnetic material.

10. A diskette as set forth in claim 8, wherein the number of stator magnetic poles in said first group is approximately half the total number of said plurality of stator magnetic poles.

11. A diskette as set forth in claim 10, wherein said stator magnetic pole teeth extending outwardly from stator magnetic poles in said first group and having stator coils wound thereon are connected to each other at the outside ends thereof by a back yoke made of soft magnetic material, and stator magnetic pole teeth extending outwardly from stator magnetic poles in said second group and having stator coils wound thereon are connected to each other at the outside ends thereof by another back yoke made of soft magnetic material.

12. A diskette as set forth in claim 2, wherein said stator has a plurality of auxiliary magnetic poles at such locations as to be able to face said rotor magnetic poles across magnetic gaps, each of said auxiliary magnetic poles having no stator coils and being connected to each other via a back yoke made of soft magnetic material.

13. A diskette as set forth in claim 12, wherein the pitch of said auxiliary magnetic poles is half the pitch of said rotor magnetic poles.

14. A diskette as set forth in claim 13, wherein the number of said auxiliary magnetic poles is no more than the number of said stator magnetic poles.

15. A diskette as set forth in claim 2, wherein a rotational axis of said hub and a rotational axis of said rotor are offset from each other.

16. A diskette as set forth in claim 15, wherein said rotation transmitting mechanism is an endless-belt type speed increasing mechanism.

17. A diskette as set forth in claim 15, wherein said rotation transmitting mechanism is one of a gear type and rubber-roller transmission type speed increasing mechanism.

18. A diskette as set forth in claim 2, wherein a rotational axis of said hub and a rotational axis of said rotor are disposed coaxially, and said rotation transmitting mechanism is a coaxial rotation transmitting mechanism.

19. A diskette as set forth in claim 18, wherein said rotation transmitting mechanism is a planetary type coaxial rotation transmitting mechanism.

20. A diskette comprising:
a diskette case;
a hub provided inside said diskette case that is drivable by an external drive mechanism; and
a permanent magnet generator provided inside said diskette case, said permanent magnet generator including
i) a rotor that is rotatably driven by said hub, said rotor having a rotatable permanent magnet, said permanent magnet having a plurality of magnetic poles arranged on the outer periphery thereof, said magnetic poles having alternately different polarities in the circumferential direction, and
ii) a stator having a plurality of stator magnetic pole teeth, said plurality of stator magnetic pole teeth each having a stator magnetic pole at an end thereof at a location where said stator magnetic pole can face one of said rotor magnetic poles across a magnetic gap, each of said plurality of stator magnetic pole teeth extending outwardly from said stator magnetic pole and having a stator coil wound thereon,
wherein said rotor and said stator are formed into a flat disk shaped assembly, and a rotation transmitting mechanism for connecting said hub to said rotor of said permanent magnet generator is provided inside said diskette, and a rotational axis of said hub and a rotational axis of said rotor are offset from each other.

21. A diskette as set forth in claim 20, wherein said rotation transmitting mechanism is an endless-belt type speed increasing mechanism.

22. A diskette as set forth in claim 20, wherein said rotation transmitting mechanism is one of a gear type and a rubber-roller transmission type speed increasing mechanism.

23. A diskette as set forth in claim 20, wherein a memory card housing space is provided inside said diskette case, and said memory card housing space and said permanent magnet generator do not overlap with each other while lying within a plane in said diskette case.

* * * * *